(12) United States Patent
Urmson

(10) Patent No.: US 6,615,100 B1
(45) Date of Patent: Sep. 2, 2003

(54) AUTOMATED ROOF TRUSS COMPONENT SAW

(76) Inventor: James Francis Urmson, 19829 Bay Lake Rd., Eustis, FL (US) 32736

( * ) Notice: Subject to any disclaimer, the term of this patent is extended or adjusted under 35 U.S.C. 154(b) by 277 days.

(21) Appl. No.: 09/630,310

(22) Filed: Jul. 31, 2000

Related U.S. Application Data

(60) Provisional application No. 60/145,734, filed on Jul. 27, 1999.

(51) Int. Cl.[7] .......................... G06F 19/00; B23D 25/00; B26D 7/06
(52) U.S. Cl. ...................... 700/167; 700/160; 83/436.3
(58) Field of Search ................................ 700/160, 167; 83/863, 865, 436.3

(56) References Cited

U.S. PATENT DOCUMENTS

| | | | | |
|---|---|---|---|---|
| 5,014,583 A | * | 5/1991 | Webb et al. ................. 83/76.9 |
| 5,201,258 A | * | 4/1993 | Cremona ..................... 83/75.5 |
| 5,444,635 A | * | 8/1995 | Blaine et al. ................ 700/171 |
| 5,819,622 A | * | 10/1998 | Quick .......................... 83/365 |
| 5,934,164 A | * | 8/1999 | Whatley, Jr. ................ 83/471.1 |
| 5,943,239 A | * | 8/1999 | Shamblin et al. ........... 700/160 |
| 6,062,281 A | * | 5/2000 | Dockter et al. ............. 144/357 |
| 6,212,983 B1 | * | 4/2001 | Pyle .............................. 83/34 |
| 6,263,773 B1 | * | 7/2001 | McAdoo et al. ............. 83/75.5 |

\* cited by examiner

*Primary Examiner*—Leo Picard
*Assistant Examiner*—Ryan Jarrett

(57) ABSTRACT

An automated saw apparatus for cutting the component pieces for roof trusses. The apparatus comprises a circular power saw, a processing line whereon stock lumber is conveyed to and from the saw, a waste bin for receiving scrap pieces cut by and discarded from the saw, a control computer and software, and sensors for measuring the lumber as it is conveyed to the saw for allowing the computer to determine how long a board to cut, and where and at what angles to make the cuts.

1 Claim, 7 Drawing Sheets

AUTOMATED ROOF TRUSS COMPONENT SAW

This Application claims the benefit of 60/145,734, filed Jul. 27, 1999.

BACKGROUND FIELD OF INVENTION

The present invention relates to computer controlled, automated power saws. Specifically those saws used in the manufacture of engineered wood roof and floor trusses. Truss components of this type require a wide variety of lengths and angle cuts. The criteria for a successful saw in today's market would have to include but not be limited to, safety, speed, accuracy, durability and low operator cost.

References Cited:

5,365,812 Harden, Charles Nov. 22, 1994
5,176,060 Thornton, Jack L. Jan. 5, 1993
4,454,794 Thornton, Jack L. Jun. 19, 1984
4,036,093 Thorsell, Roland H. Jul. 19, 1977
3,910,142 Jureit, John C. Oct. 7, 1975

BACKGROUND DESCRIPTION OF PRIOR ART

There are several saws available to truss builders today. Some manual and some computer controlled. The driving force in innovation is to increase production and accuracy as well as decrease labor cost.

An example is that of Harden, U.S. Pat. No. 5,365,812. Harden discloses a saw pivoting on a centerline but moving in a horizontal cutting motion requiring excessive movement to complete a cut. The saw is also unable to angulate until fully retracted. The lumber cannot be cut on both ends without the operator manually rotating it horizontally and inserting it back into the saw. The Harden saw is computer controlled but requires repetitive operator input to initiate successive functions.

The Thornton Saw U.S. Pat. No. 5,176,060 is a two blade saw with no computer control. All angles and work piece lengths are set manually. The machine is efficient at making repetitive cuts producing identical pieces but slow manual setup time makes it impractical. The previous Thornton Saw U.S. Pat. No. 4,454,794 is a similar machine although it is a single blade saw. It is also manually set with the same limitations as the two blade saw.

The Thorsell Machine U.S. Pat. No. 4,036,093 cuts in a vertical motion although operated by means of electric motors and a lead screws which are prone towards fouling with saw dust. The structure of the saw frame is not designed to eliminate lateral deflection at the saw blade making it difficult to ensure accuracy.

The Jureit Saw U.S. Pat. No. 3,910,142 is very similar to the Harden machine referred to earlier. This saw operates in the same manner although was not able to make use of the current PC technology. The Jureit Saw also requires excessive operator input.

SUMMARY

The Invention discloses an automated saw apparatus for cutting the component pieces for roof trusses. The apparatus comprises a circular power saw, a processing line whereon stock lumber is conveyed to and from the saw, a waste bin for receiving scrap pieces cut by and discarded from the saw, a control computer and software, and sensors for measuring the lumber as it is conveyed to the saw for allowing the computer to determine how long a board to cut, and where and at what angles to make the cuts.

OBJECTS AND ADVANTAGES

Accordingly several objects and advantages are as follows, the truss component saw herein described automatically stores, interpolates and displays to the operator data necessary to perform the task of cutting truss component members. As truss component members are by necessity comprised of many different lengths as well as various angle configurations it is necessary that the machine be tractable in its movement as well as conservative of its motion.

An object of the present invention is to perform multiple functions with one apparatus as in the feed conveyors. The feed rollers convey the lumber in and out of the saw as well as measure, position and hold the wood in place as the cut is made.

Another object is to make efficient use of readily available cutting data from the truss engineering program without time consuming operator input.

This is accomplished by using the computer to select the order of cut and give an uninterrupted flow of operation.

A further object and advantage is to angulate the saw head by means of a servo motor coupled to a ninety degree worm gear drive. This configuration, which has no exposed moving parts, is not subject to fouling by saw dust. The servo motor and worm gear drive combination also, as before performs multiple functions as it sets the angle of cut as well as locks the cut head in position to insure an accurate cut. The rotational play caused by clearance between the gear teeth is compensated for in the motion control software.

Another object is to construct a saw that is a self contained unit, capable of being transported easily and requiring no excessive setup procedure. This is accomplished by providing a rigid self supporting frame to which all the saw components are attached. The saw requires no leveling, calibrating nor does it need to be bolted to a concrete base, A still further object pertains to safety. All of the saws moving parts are housed within a heavy gauge steel cabinet whose door is equipped with an electronic safety lock and all the electrical components are housed within heavy gauge steel, dustproof enclosures.

DRAWING FIGURES

FIG. 1 illustrates the saw with safety enclosures in place. "A-1" is the base welded steel structure that makes up the saw frame. "A-2" is the dustproof electronic cabinet which holds all computer components as well as motor control hardware. "A-3" is the operator panel which includes the operator control switches and computer interface controls as well as the computer monitor. "A-4" is the saw safety enclosure which is comprised off steel panels that fully enclose all the moving parts as well as limit the dispersal of saw dust into the work environment. "A-5" is the enclosure access door which is also constructed of steel and equipped with an electronic safety lock to block access to the saw while it is operating as well as disabling saw starup while the door is open. "A-6" and "A-7" are roller conveyors which are supported on tension springs and allow lumber to feed in with little drag.

FIG. 2 shows the saw with the safety enclosure removed, exposing the moving parts to view. "A-1" is the welded steel frame. "A-2" is the electronic cabinet. "A-3" is the operator panel. "A-6" and "A-7" are the roller conveyors. "B-4" shows the four feed roller cradles which support parts "A-6"

and "A-7" as well as provide a mounting base for "C-3" feed roller pillow block bearings. "C-1" is the infeed roller and "C-2" is the outfeed roller both of which are controlled by the "C-4" servo motors. Roller carriage "D-1" which allows the saw to perform the up/down movement necessary to perform the cut, is comprised of a heavy plate steel frame with six radius cut rollers "D-9" (not pictured) "D-3" the offset motor mount is set in tapered roller bearings w allow the saw motor to easily pivot 180 degrees and offset to allow the blade to pivot on a centerline.

FIG. 3 shows the hair frame. All components in this view are welded to make a suitably rigid one piece structure. The parts are as follows, "A-1" steel base, "B-2" the tube steel vertical support tubes, "B-3" mounting block, "B-4" roller conveyor cradle, "B-5" electronic cabinet pedestal, "B-6" tube steel support cap and "B-7"support cap braces.

The "D-2" pivot head bearing assembly bolts directly to the carriage support arid holds the pivot shaft of "D-3" offset motor mount. The "D-5" saw blade which is attached to the shaft of "D-4" saw motor is positioned directly below and inline with the pivot shaft as to make it possible to pivot on its centerline. Attached to the upper pivot shaft is the "D-7" reduction drive which is turned by "D-6" pivot head servo motor.

Also shown is the "D-8" vertical saw carriage pneumatic cylinder which raises and lowers the carriage assembly as needed to perform the cuts.

Figure 6:
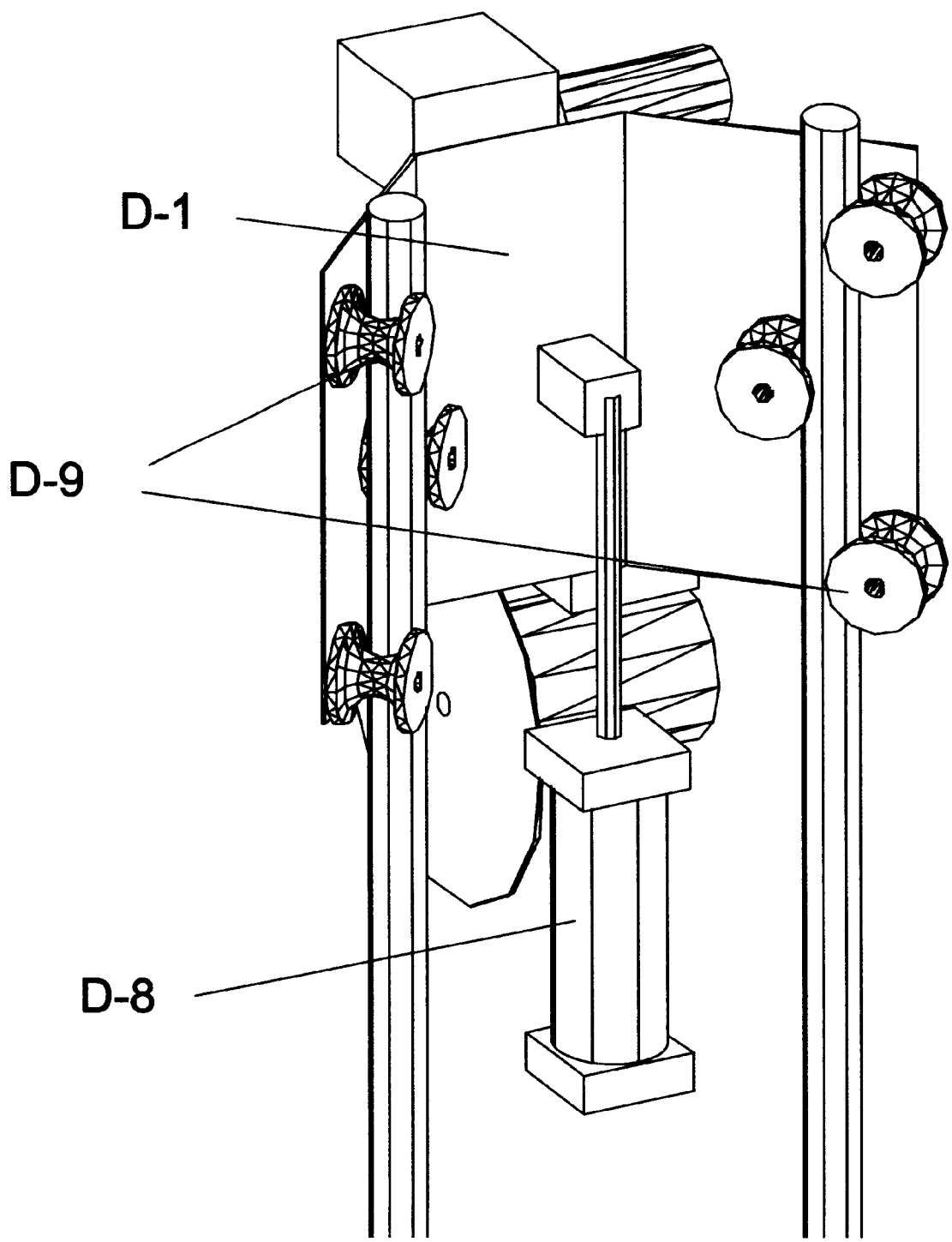

FIG. 6 is a rear look at the carriage assembly with the back section of the "D-1" carriage support removed to show the "D-9" radius cut saw carriage rollers and the attachment of "D-8" Vertical saw carriage pneumatic cylinder.

Figure 7:
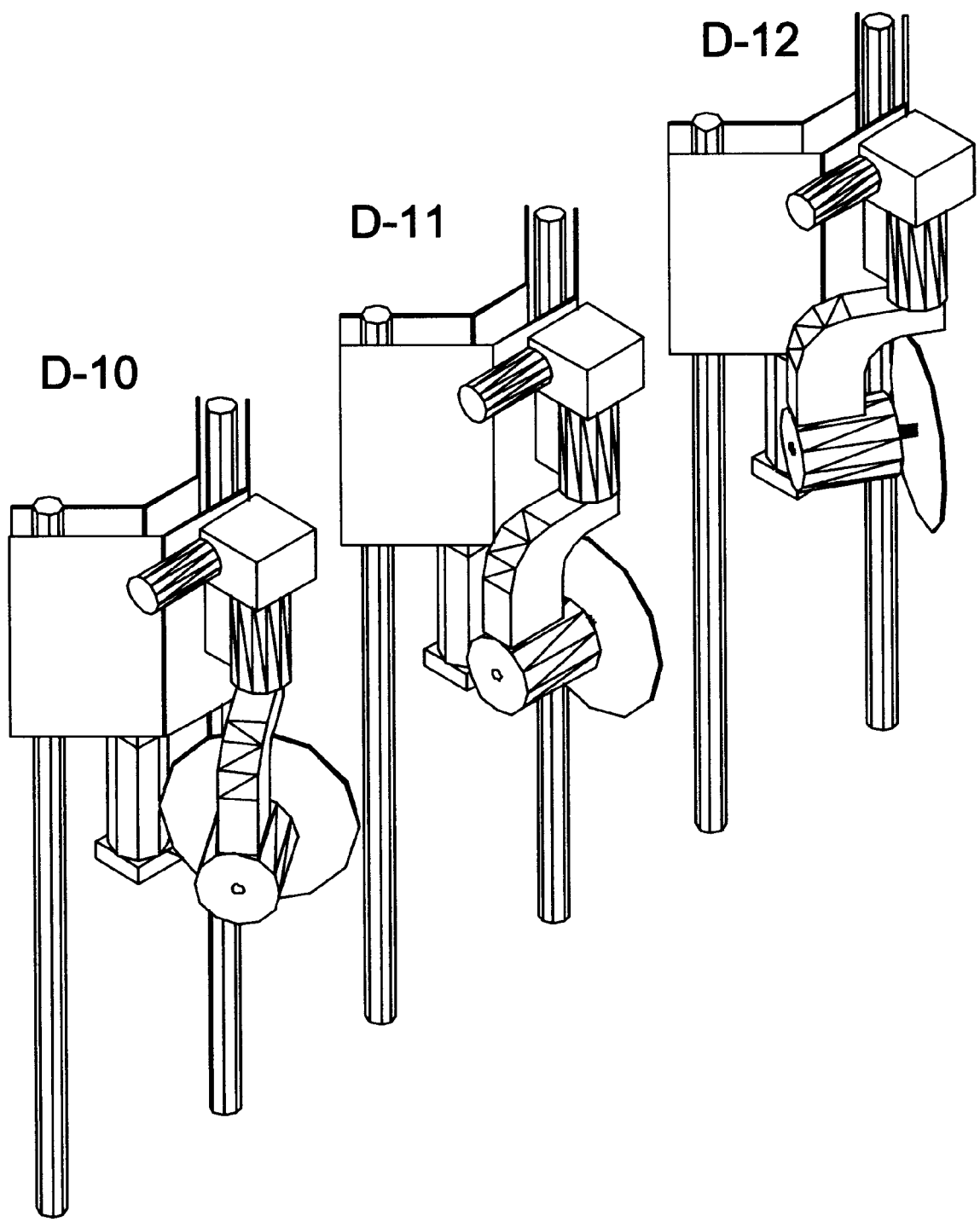

FIG. 7 illustrates the pivoting movement of the of the saw head "D-10" shows the saw set to make a 60 degree cut, "D-11" a 90 degree cut and "D-12" a 120 degree cut.

LIST REFERENCE NUMERALS

Figure 1:
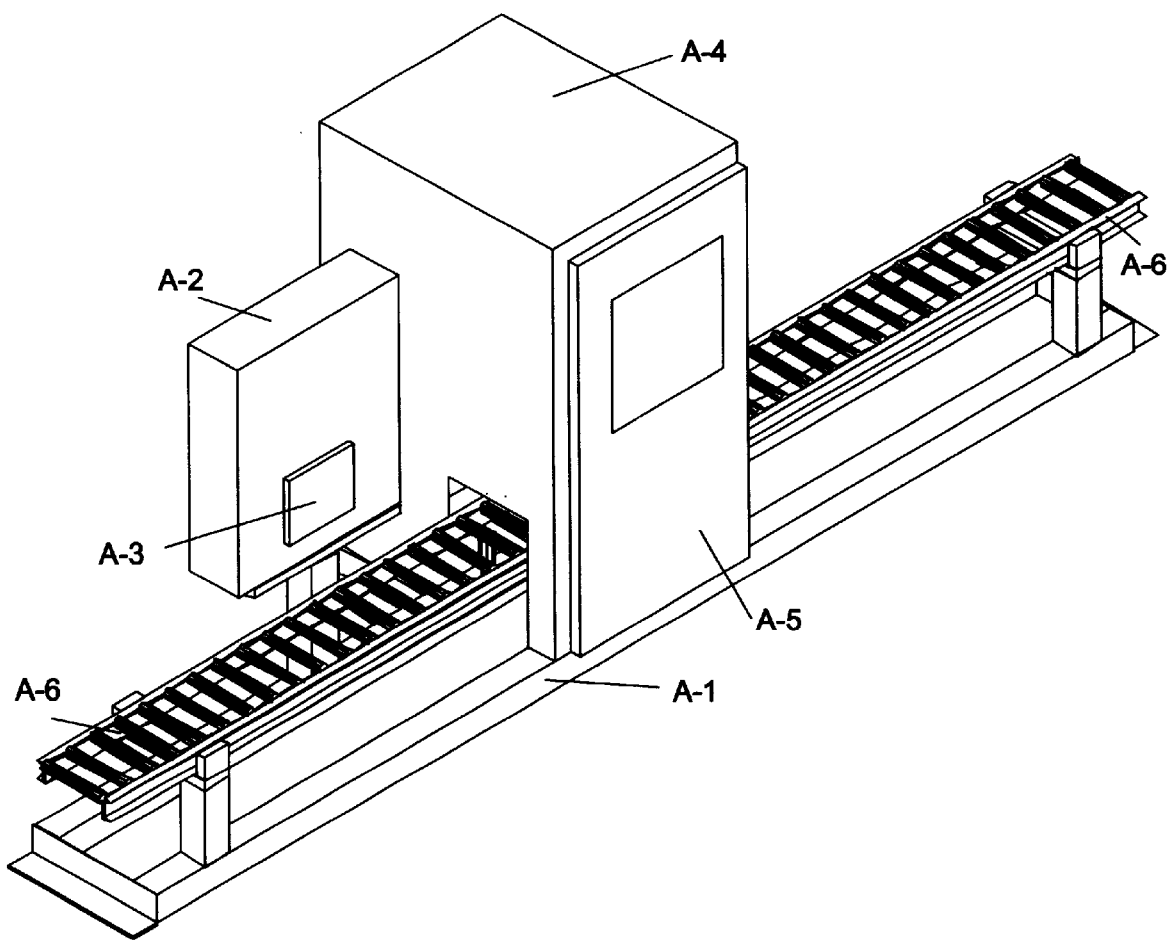
Figure 2:
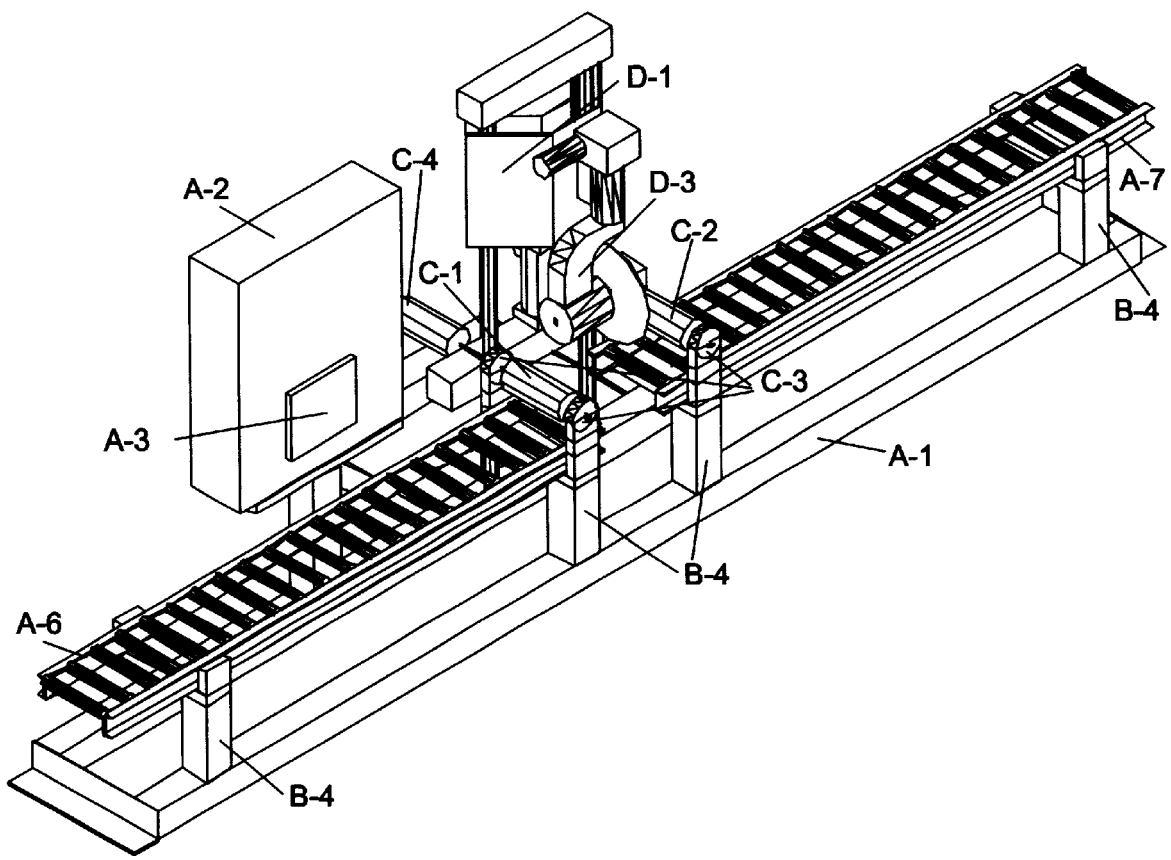
Figure 3:
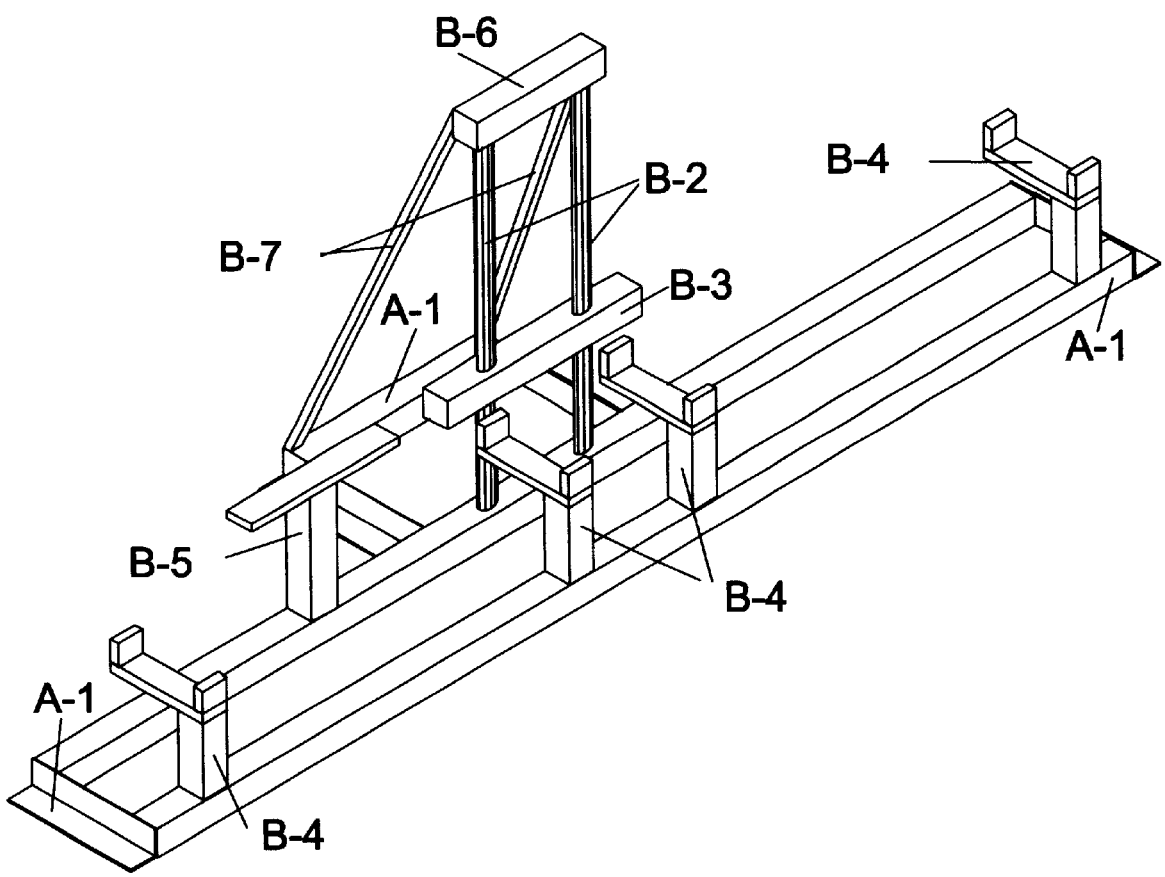
Figure 4:
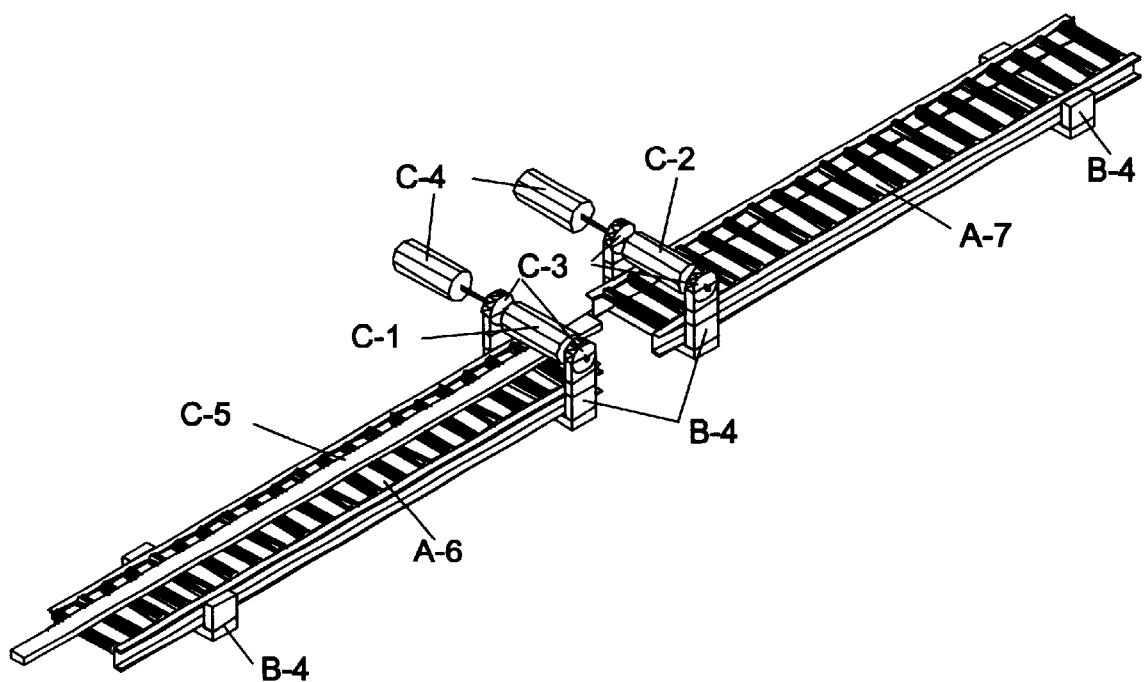
FIG. 4 depicts the feed roller assembly which is made up of the "C-1" and "C-2" feed rollers which are knurled steel rollers supported by "C-3" pillow block bearings bolted to supports "B-4" feed roller cradles which also support parts "A-6" and "A-7" roller conveyors. The item "C-5" illustrates the placement of lumber into the machine.
Figure 5:
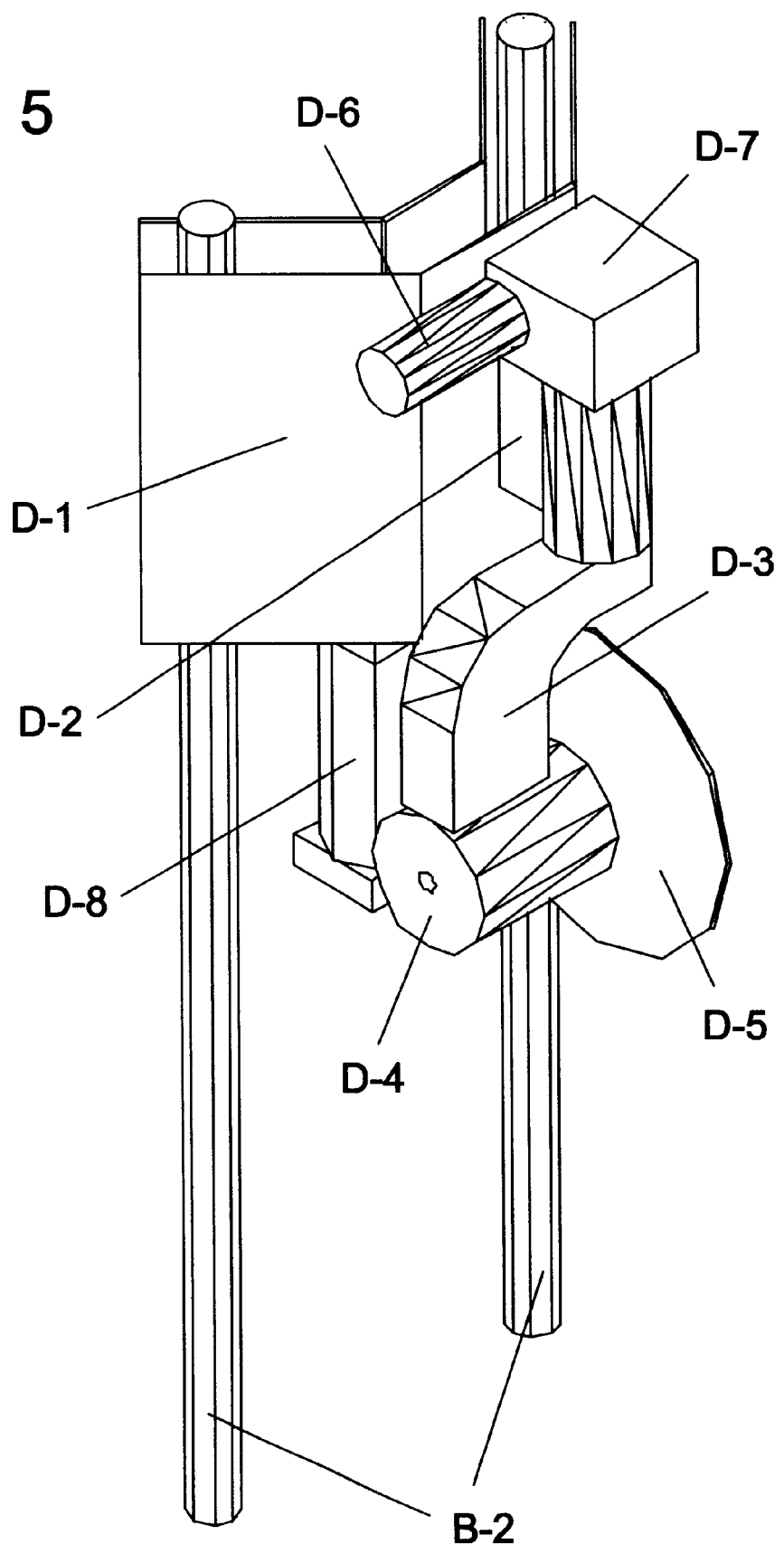
FIG. 5 shows the roller carriage/saw head assembly. The "D-1" roller carriage support consists of a front and back section and provides mounting for the six radius cur rollers that mate to the "B-2" support tubes.

FIG. 1
A-1 Saw frame
A-2 Electronic cabinet
A-3 Operator panel
A-4 Saw enclosure
A-5 Enclosure access door
A-6 Infeed roller conveyor
A-7 Outfeed roller conveyor
FIG. 2
A-1 Saw frame
A-2 Electronic cabinet
A-3 Operator panel
A-6 Infeed roller conveyor
A-7 Outfeed roller conveyor
B-4 Feed roller cradle
C-1 Infeed roller
C-2 Outfeed roller
C-4 Feed roller servo motors
D-1 Roller carriage support
D-3 Offset motor mount
FIG. 3
A-1 Welded steel base
B-2 Tube steel vertical support tubes
B-3 Mounting block
B-4 Feed roller cradle
B-5 Electronic cabinet pedestal
B-6 Tube steel support cap
B-7 Support cap braces
FIG. 4
C-1 Infeed roller
C-2 Outfeed roller
C-3 Feed roller pillow block bearings
C-4 Feed roller servo motors
C-5 Lumber on infeed conveyor
A-6 Conveyor roller
A-7 Conveyor roller
B-4 Feed roller cradle
FIG. 5
D-1 Roller carriage support
D-2 Pivot head bearing assembly
D-3 Offset motor mount
D-4 Saw motor
D-5 Saw blade
D-6 Pivot head servo motor
D-7 90 degree worm gear reduction drive
D-8 Vertical saw carriage pneumatic cylinder
B-2 Tubular vertical support tubes
FIG. 6
D-1 Roller carriage support
D-8 Vertical saw carriage pneumatic cylinder
D-9 Radius cut Saw carriage rollers
FIG. 7
D-10 Saw head set for a 60 degree cut
D-11 Saw head set for a 90 degree cut
D-12 Saw head set for a 120 degree cut Operation of Automated Roof Truss Component Saw The saw is started by switching the main disconnect to "ON". This switch is mounted on the control panel (FIG. 1/A-3). This will power up the saw and computer. The computer will then boot up and open the saw program. The operator will then select a data "CUT" file from the "JOBS" menu and the system will load the selected data into the program.

The operator will then activated the "START SAW" and START CYCLE" buttons on said control panel and as the "READY" sign comes up on the LCD monitor the lumber can be fed into the infeed roller (FIG. 2/C-1). The device will automatically measure and set the angles of cut as prescribed in the input data as well as pneumatically raise and lower the saw head performing the cuts until it has used up the lumber inserted into the saw. The device will then redisplay the "Ready" sign and the operator will feed another piece of lumber into the machine. This action will continue until the "JOB" is finished.

On the outfeed end of the machine the operator will mark the web designation on the finished workpiece (lumber) or affix a printed label as needed. He will then stack the finished piece on the lumber cart and repeat the cycle until finished.

Description of Automated Roof Truss Component Saw

A saw frame (FIG. 1/A-1) made up of heavy wall square steel tubing, welded to make a rigid frame capable of supporting all saw components. Extending from the base are two parallel machined tubes (FIG. 3/B-2) that make up a track allowing the saw assembly to move in a smooth up and down direction minimizing any lateral deflection yet allowing enough clearance as to not be fouled by an accumulation of saw dust. Said base allows for six areas (FIG. 3/A-1) to level and bolt saw frame to a suitable floor although leveling and bolting are not necessary for the operation of said saw. Extending from the front of the base are four conveyor cradles (FIG. 2/B-4), they are designed to support the weight and insure alignment of the conveyor assembly.

A roller conveyor assembly (FIG. 4) set at waist height as to aid operator comfort in loading mid unloading of work pieces (lumber), comprised of a spring mounted roller conveyor (FIG. 2/A-6, A-7) on the infeed and outfeed ends of the machine. Said conveyors (FIG. 2/A-6, A-7) are spring mounted to insure close contact between the workpiece (lumber) and the feed rollers. Mounted in closest proximity to the saw blade are two teed rollers (FIG. 2/C-1, C-2) which are knurled to eliminate slippage as lumber is fed through the saw. Supporting said feed rollers are pillow blocks (FIG. 2/C-3) which bolt to the conveyor supports (FIG. 2/B-4). Directly above and offcenter to the rear of said roller conveyor is an adjustable fence (not pictured) to insure proper alignment of the work piece. Attached to the input shaft of said feed rollers are a servo motor and planetary gear drive (FIG. 4/C-4). These control the movement of the workpiece (lumber) as well as measurement of said workpiece. These servo motors are wired to the servo amplifier (not pictured) in the control cabinet (FIG. 2/A-2).

A roller carriage assembly (FIG. 5) consisting of a roller frame and rollers (FIG. 5/D-1, D-9) whose rollers move against a round steel rube track (FIG. 5/B-2) at a close tolerance fit as to eliminate any lateral deflection. Attached to this frame is a pivot head bearing assembly (FIG. 5/D-2) which hold an upper and lower tapered roller beating (bearings not pictured). These bearings allow the saw blade to pivot on a centerline in relation to the work piece (lumber). Extending vertically up through the inner race of these beatings is a solid steel shaft which is attached to the offset motor mount (FIG. 5/D-3). Said motor mount is offset as to hold the blade (FIG. 5/D-5) centerline directly below and aligned with the motor mown pivot shaft. Attached to and set at right angles to said motor mount pivot shah is the saw motor (FIG. 5/D-4). It is a dustproof electric motor of sufficient horse power to perform the work. Attached to the output shah of said saw motor is the saw blade (FIG. 5/D-5), it is a standard steel blade. Holding said blade to the shaft are 8" flat washers (not pictured) to minimize blade distortion.

Attached to the top of said motor mount pivot shaft is the worm gear reduction drive (FIG. 5/D-7). It turn at 50 to 1 reduction and has a hollow output shaft allowing the pivot shaft to mount directly to the reduction drive. Mounted to the input shaft of said reduction drive is a permanent magnet servo motor (FIG. 5/D-6). This motor is used to set and hold the saw at the prescribed angles. (See FIG. 7 saw set at three angles.) The servo motor is wired to the servo amplifier (not pictured) in the control cabinet (FIG. 1/A-2).

The saw has various sensors to initiate and regulate automatic function. They are as follows: A proximity switch mounted under the input feed table (FIG. 1/A-6) to signal that lumber has been fed into the machine thus initiating the automatic cycle. Two proximity switches mounted to the roller carriage frame (FIG. 6) to sense up and down limits to carriage travel. Two proximity switches mounted to the motor mount pivot shaft (FIG. 5/D-3) to sense limits in the pivot angle.

A fail-safe limit switch to activate an emergency stop condition it said saw head rotates beyond usable limits. The control cabinet (FIG. 1/A-2) houses all the electronics for the machine. These include: The computer which is an IBM compatible PC, a LCD monitor mounted in the door of the cabinet, three servo amplifiers, power supplies, one three phase motor starter, one 50 amp main disconnect, ventilation fan and filter, various terminal blocks, fuse blocks and relays.

The pneumatic system consists of two functions. The first is a large bore pneumatic cylinder (FIG. 6/D-8) that cycles the roller carriage assembly (FIG. 5) in an up-down direction, dropping the saw blade into the lumber below it thus making a cur. Said cylinder is charged in the up direction only, the weight of the saw causes it to drop as the air is released by the #1 pneumatic valve (not pictured). The second function is that of clamping the lumber in place against the fence as it is being cut. This is performed by two small clamping cylinders (not pictured) which are controlled together by pneumatic valve #2 (not pictured).

I claim:

1. An automated saw comprising:
    a frame of ample mass and rigidity to connect and support all saw components so as to make the device self supporting in a manner as to not require any sort of leveling or bolting to a floor or footing of any kind, thus allowing it to be easily portable;
    a workpiece conveyor consisting of a computer controlled servo motor driven feed roller system capable of conveying a piece of lumber to its precise cut coordinates where the system will pause to automatically perform a cut then index the piece of lumber to its next cut coordinate, continuing this cycle until the system senses that no lumber is present;
    a computer controlled angulating saw head capable of rapid angular as well as vertical movement;
    a computerized control system whereby input cutting data is translated to motion control necessary for saw function and whereby software code controls an exact sequence of saw and conveyor functions dependant and in response to innumerable variables with little or no operator input.

* * * * *